Feb. 21, 1928.

G. FORNACA

WHEEL FOR MOTOR VEHICLES

Filed Sept. 20, 1926

1,660,036

Inventor
Guido Fornaca,
By Henry Orth Jr.
Atty

Patented Feb. 21, 1928.

1,660,036

UNITED STATES PATENT OFFICE.

GUIDO FORNACA, OF TURIN, ITALY.

WHEEL FOR MOTOR VEHICLES.

Application filed September 20, 1926, Serial No. 136,594, and in Italy September 28, 1925.

It is well known that motor vehicles, especially tractors, that have sometimes to work on soft ground, must have their wheels provided with endless tracks, teeth, vanes or other suitable devices the purpose of which is to increase the adherence of the wheels. However, such a construction is not convenient when the vehicle has also to run on firm ground, preferably at a relatively higher speed.

Therefore, it is usual to provide removable vanes that are applied to the wheels when required; but obviously the application means a loss of time and is bound up with difficulties owing to the conditions under which the work has to be performed.

The object of the present invention is to eliminate these inconveniences.

Accordingly, I provide a motor vehicle wheel capable of running on ground of various consistency, having a felloe or rim of T-shaped section (or any other section with radially arranged ribs) equipped with shoes, one surface of each of which is suitable for soft ground whereas the opposite surface is suitable for firm ground, said shoes being so mounted that they may be overturned in order to bring either surface to the outside.

Preferably, the shoes are arranged in two rows in staggered relationship with a space between every two shoes of one row but so that said space is bridged by a shoe of the other row. Owing to this staggered arrangement, continual contact with the ground is afforded.

Said shoes may each be provided on one of its faces with contact vanes and on its other face with a rubber sole, such that by simply overturning the shoe, the wheel can be quickly transformed accordingly as the vehicle has to run on soft or hard ground.

By way of example, one constructional form of the improved wheel is illustrated on the accompanying drawing.

Figure 3:
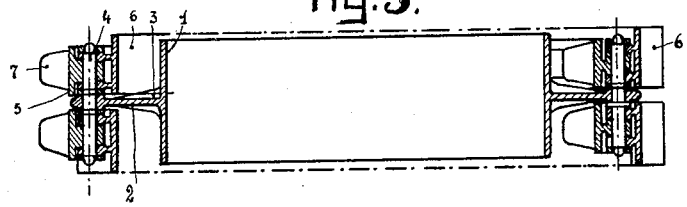
Fig. 3 represents a section on the line A—B of Fig. 1.
Figure 1:
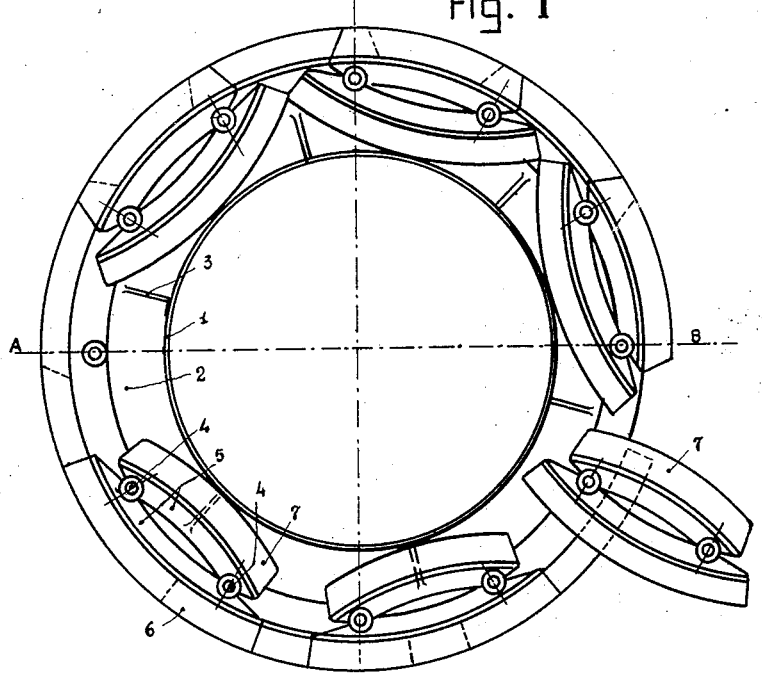
Fig. 1 is a side view thereof.
Figure 2:
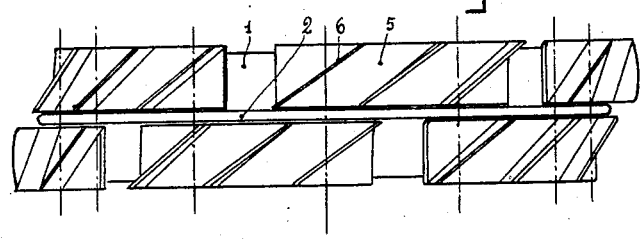
Fig. 2 is a plan with the shoes arranged for soft soil.

Referring to the drawing, 1 denotes the T-shaped felloe or rim of the wheel, in which the vertical rib 2, provided with reinforcements 3, carries shoes 5 on each side, said shoes being secured thereto by pins 4 and each having the form of a double circular segment provided on one of its faces with sloping vanes or treads 6 and on its other face with rubber soles 7.

The shoes are arranged in two staggered rows, so that the space between two shoes in one row on one side of the wheel is bridged by a shoe belonging to the other row at the other side of the wheel, whereby the contact with the soil is continuous.

When the vehicle is running on firm ground, the shoes are arranged with their rubber shoes 7 outwards and the wheel then appears to be provided with a non-slipping solid rubber tyre.

When, on the contrary, the vehicle has to run on soft ground, one of the two securing pins for each shoe is withdrawn and all the shoes are turned over one by one to bring their vanes outwards, whereafter the shoes are again secured by replacing the pins.

This operation is effected in a very short time and does not present any difficulty.

It will be understood that the shoes, instead of having vanes at one side and solid rubber soles at the other, may be provided on one side with teeth or studs and show a metallic smooth or corrugated surface on the other side. Further, the shoes may be arranged or formed in other ways without departing from the spirit or scope of the invention.

What I claim is:

1. A wheel of the character described comprising a rim T-shaped in cross-section constituting a cylindrical portion and an exterior radial rib, a series of pivot-pins projecting through the rib, a reversible shoe on each side of the latter pivoted near one end to each pin and having oppositely curved tread surfaces, and a series of locking pins interposed between the pivot pins projecting through said rib and the opposite end portions of the shoes.

2. A wheel of the character described comprising a rim T-shaped in cross-section constituting a cylindrical portion and an exterior central radial rib, a series of transverse pivot-pins fixed in the rib at equal intervals, a reversible shoe pivoted near one end to each pin on each side of said rib, each shoe having oppositely curved tread surfaces, the shoes on one side of the rib being pivoted in staggered relation to the shoes on the opposite side and adapted to swing in opposite directions, and a series of removable locking pins projecting through the rib and the opposite end portions of the shoes.

In testimony that I claim the foregoing as my invention I have signed my name.

GUIDO FORNACA.